UNITED STATES PATENT OFFICE.

PETER PETERSEN, OF INDIANAPOLIS, INDIANA, ASSIGNOR OF ONE-HALF TO THOMAS J. COSTER, OF CHICAGO, ILLINOIS.

PROCESS FOR PRODUCING LACTIC FERMENT CULTURE FOR MILK.

1,401,278.     Specification of Letters Patent.     Patented Dec. 27, 1921.

No Drawing.     Application filed December 8, 1920. Serial No. 429,055.

*To all whom it may concern:*

Be it known that I, PETER PETERSEN, a citizen of the United States, residing at Indianapolis, in the county of Marion and State of Indiana, have invented certain new and useful Improvements in Processes for Producing Lactic Ferment Culture for Milk, of which the following is a specification.

The invention relates to process for producing lactic ferment culture for milk.

One of the objects of the invention is to provide a method of procedure for producing lactic ferment culture in milk, by a simple operation, whereby to make the propagation of lactic acid bacteria a definite quantity and eliminating objectionable variables.

By pursuing the course outlined herein, it is possible to manufacture a product possessing a good aroma and delightful flavor that will remain smooth and creamy and which will not separate.

The propagation may be continued without renewing the culture as the media is absolutely sterile.

In carrying the invention into effect I select a suitable quantity of clean, fresh, sweet milk containing the desirable amount of milk solids—not fats—as the medium for the culture, which is kept cool to check the development of undesirable micro-organisms, until treatment is begun.

The milk is poured into, preferably, five gallon cans, called herein starter cans, which are clean and thoroughly sterilized, until each can is about three-quarters filled. Each can is preferably provided with an inseparable internal agitator, capable of being operated without exposing it to the effect of outside atmospheric influences which would contaminate the contents of the cans.

The cans, conveniently four in number, each containing the above specified quantity of milk, are placed in suitable chambers and substantially submerged in water. Steam is then sprayed into the water and its temperature is thus raised to approximately 190 degrees Fahrenheit and maintained at this temperature for one hour to one hour and one-half. This will effectually pasteurize the contents of the cans and kill substantially all of the micro-organisms without caramelizing or modifying the solids of the milk which would render the product unfit for a culture medium.

While being heated, as above, the contents of the cans are stirred, or otherwise agitated, in intermittent periods of about ten minutes, thereby to distribute the heat evenly throughout the entire mass of the product.

After the expiration of the specified holding period the product is cooled quickly to ordinary room temperature. During the cooling operation the medium should be agitated or stirred until the entire mass has been thus uniformly cooled.

The heating and subsequent cooling, as above outlined, attended with the necessary agitation, is to be repeated for three successive days, and the product should be maintained at ordinary room temperature between treatments.

The sterilized milk is now poured into a number of one quart bottles, filling each bottle about three-quarters full. The contents of the bottles are then inoculated with from 10 CC to 15 CC of the pure culture of streptococcus lacticus and sealed with a sterilized cotton plug and a milk bottle cap and each bottle well shaken to distribute the culture evenly throughout the milk, to insure complete and uniform coagulation. After the above treatment, the bottles are submerged in a suitable receptacle which is filled to overflow with water at temperature of 68 to 70 degrees Fahrenheit to prevent development of gas formers or other varieties of micro-organisms which would spoil the finished product.

When the ferment is thoroughly coagulated, so that it will show seven-tenths of one per cent. to eight-tenths of one per cent. acid, it is cooled rapidly to a temperature below fifty degrees Fahrenheit to prevent further development of acid. This may be done by using iced water or brine, stirring or otherwise agitating the ferment while cooling.

To use the ferment or culture the milk cans, or other containers, are inoculated with culture, prepared as above, about one-half pint being well mixed with as much milk as may be contained in the ordinary standard milk shipping can. The milk so treated should be maintained at 68 to 70 degrees Fahrenheit during the entire incubating process which is about twelve hours.

Milk, when treated with the ferment culture, as above, is greatly improved in flavor, aroma and texture and it is especially adaptable for the manufacture of oleomargarin, bread making and other such purposes and I have found from practical experience that it may advantageously be substituted for more expensive pure cream in making ice cream, producing a product in every way as acceptable if not superior.

While I have disclosed a method of carrying my invention into effect, I wish it to be understood that it is limited only within the scope of the appended claim.

Having described my invention what I claim as new and desire to secure by Letters Patent, is:—

The method of producing milk ferment culture which consists in placing a suitable quantity of milk of selected quality in a closed container; submerging the container in a heated fluid to raise the temperature of the milk to 190 degrees Fahrenheit; maintaining this temperature for one hour to one hour and one-half; agitating the contents of the receptacles while being heated; quickly reducing the temperature to ordinary room temperature approximately 70 degrees Fahrenheit, agitating the contents of the receptacles while being cooled; maintaining said contents at the reduced temperature for ten to twelve hours, repeating the procedure as above outlined for three successive operations, then quickly reducing the temperature of the product to 68 to 70 degrees Fahrenheit, adding the ferment, maintaining this temperature for ten to twelve hours, and then preserving the product at a temperature of 40 to 50 degrees Fahrenheit as a culture for untreated milk.

In testimony whereof I hereunto subscribe my name.

PETER PETERSEN.